No. 651,822. Patented June 19, 1900.
C. BURNETT & H. T. NEWBIGIN.
APPARATUS FOR CLEANING OR WASHING PYRITES OR OTHER MINERALS.
(Application filed July 6, 1899.)
(No Model.) 5 Sheets—Sheet 1.
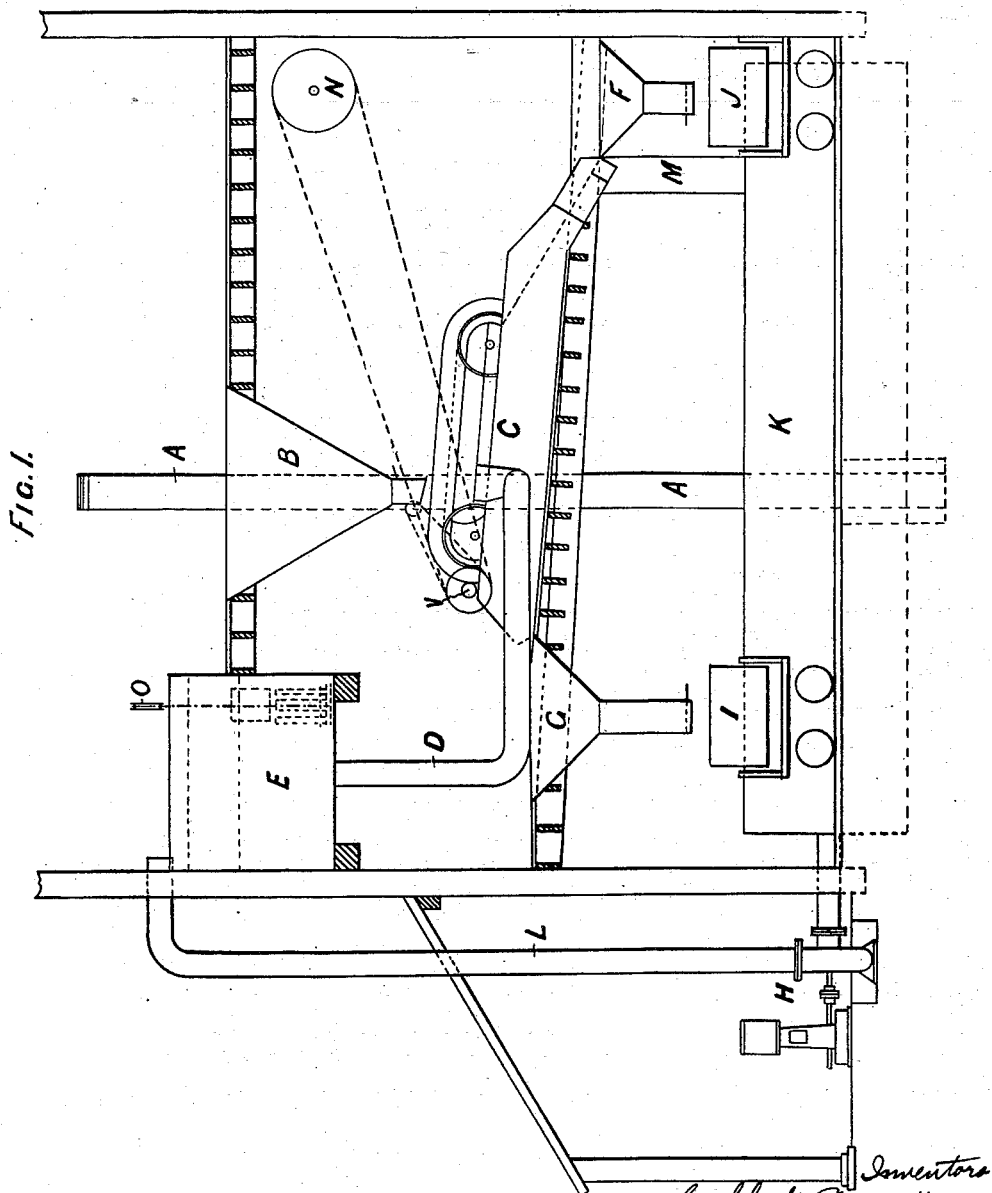

No. 651,822. Patented June 19, 1900.
C. BURNETT & H. T. NEWBIGIN.
APPARATUS FOR CLEANING OR WASHING PYRITES OR OTHER MINERALS.
(Application filed July 6, 1899.)
(No Model.) 5 Sheets—Sheet 2.
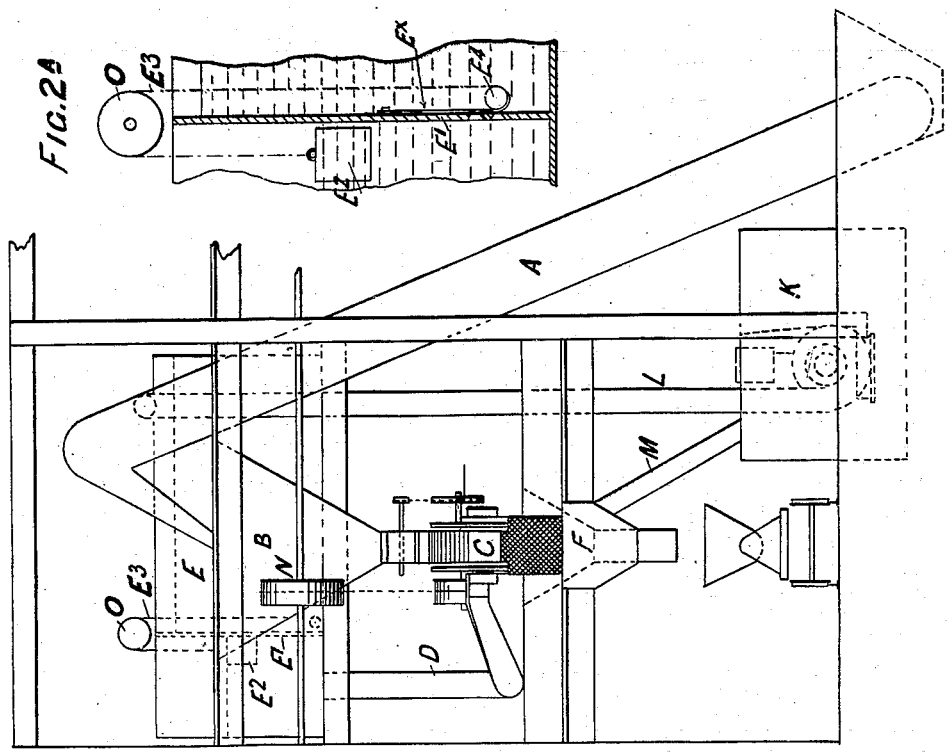

No. 651,822. Patented June 19, 1900.
C. BURNETT & H. T. NEWBIGIN.
APPARATUS FOR CLEANING OR WASHING PYRITES OR OTHER MINERALS.
(Application filed July 6, 1899.)
(No Model.) 5 Sheets—Sheet 3.
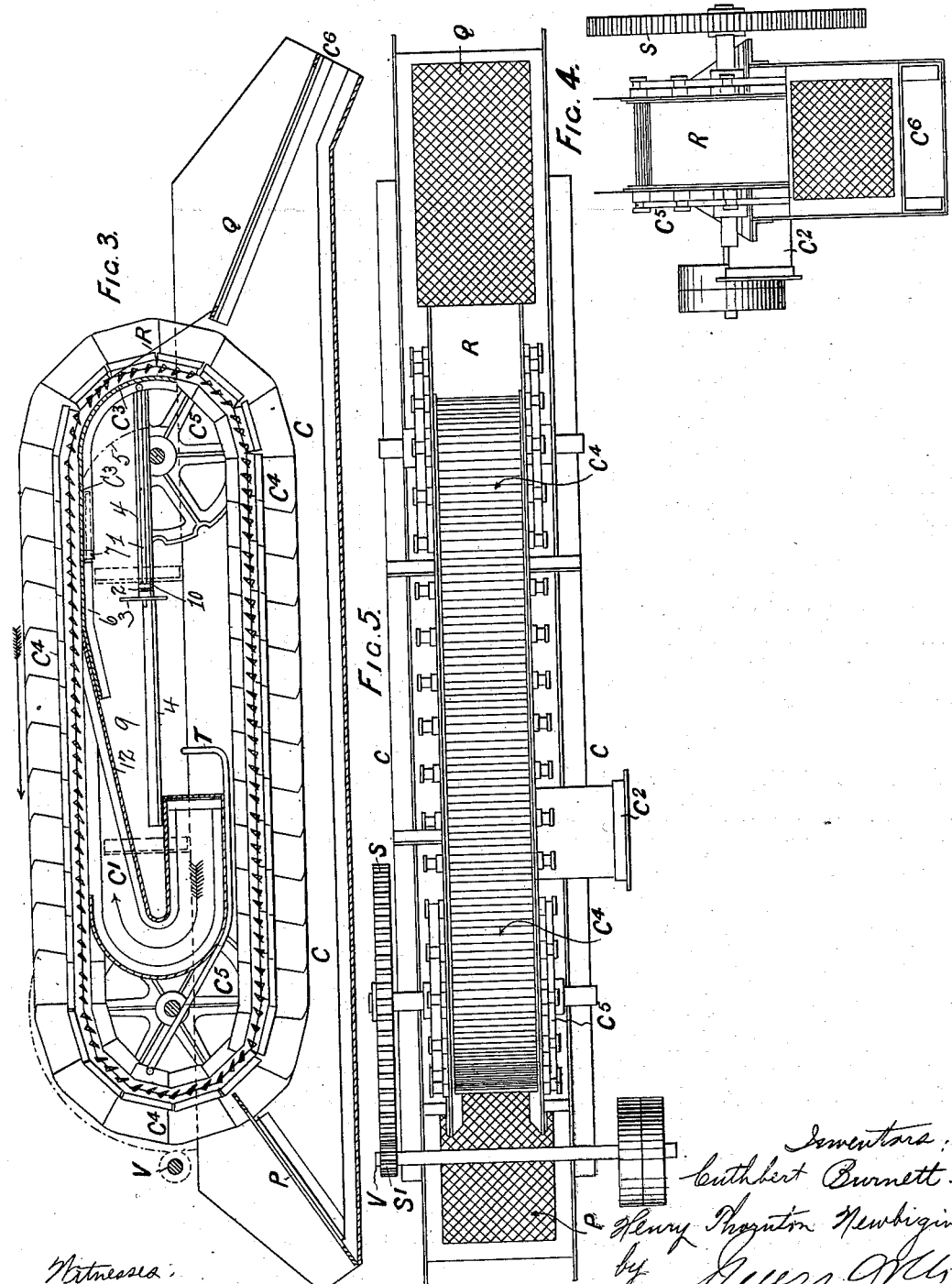

No. 651,822. Patented June 19, 1900.
C. BURNETT & H. T. NEWBIGIN.
APPARATUS FOR CLEANING OR WASHING PYRITES, OR OTHER MINERALS.
(Application filed July 6, 1899.)
(No Model.) 5 Sheets—Sheet 4.
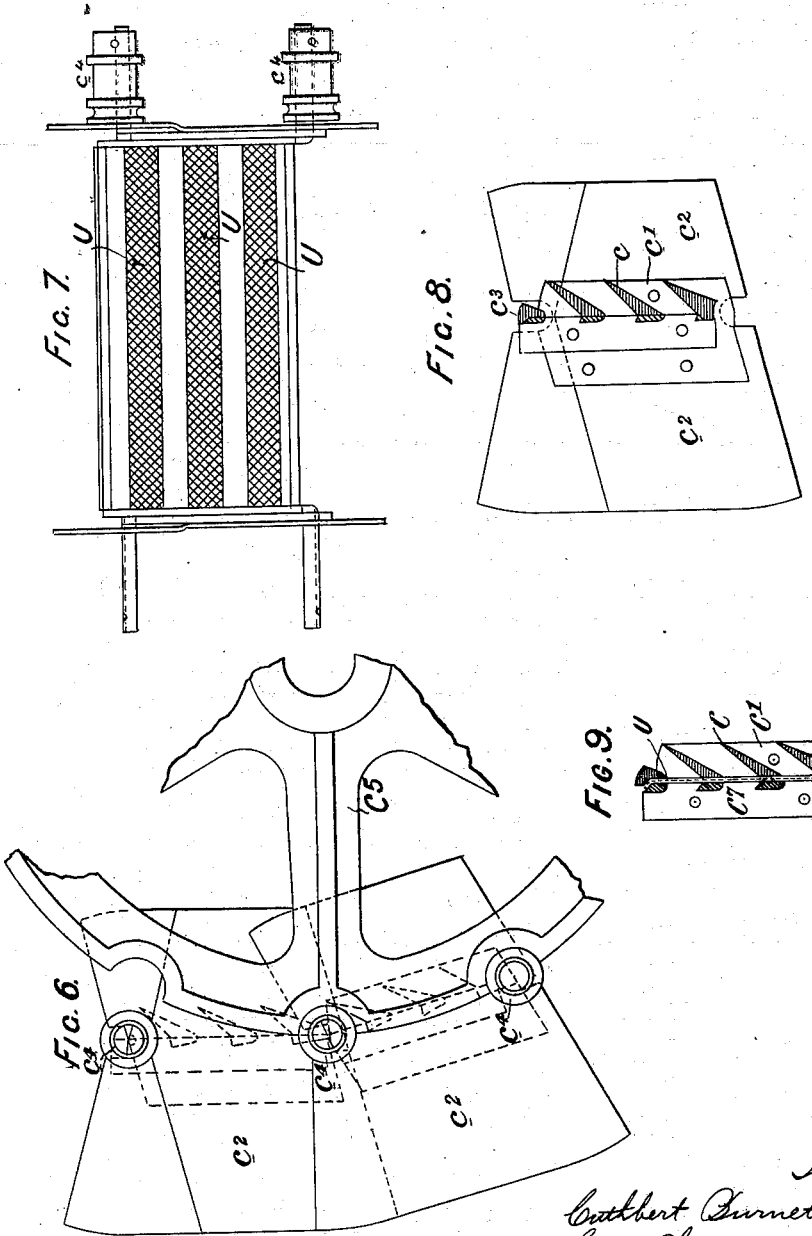

No. 651,822. Patented June 19, 1900.
C. BURNETT & H. T. NEWBIGIN.
APPARATUS FOR CLEANING OR WASHING PYRITES OR OTHER MINERALS.
(Application filed July 6, 1899.)

(No Model.) 5 Sheets—Sheet 5.

UNITED STATES PATENT OFFICE.

CUTHBERT BURNETT, OF THE GRANGE, AND HENRY THORNTON NEWBIGIN, OF NEWCASTLE-UPON-TYNE, ENGLAND.

APPARATUS FOR CLEANING OR WASHING PYRITES OR OTHER MINERALS.

SPECIFICATION forming part of Letters Patent No. 651,822, dated June 19, 1900.

Application filed July 6, 1899. Serial No. 722,991. (No model.)

*To all whom it may concern:*

Be it known that we, CUTHBERT BURNETT, residing at The Grange, near Durham, and HENRY THORNTON NEWBIGIN, residing at 15 Chester Crescent, Newcastle-upon-Tyne, England, subjects of the Queen of Great Britain and Ireland, have invented certain new and useful Improvements in Apparatus for Cleaning or Washing Pyrites or other Minerals, of which the following is a specification.

The object of our invention is to provide machinery for cleaning or washing pyrites, coal, and other minerals in a more thorough and expeditious manner than heretofore.

Figure 11:
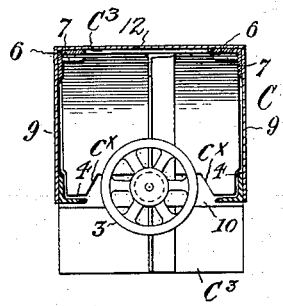
Figure 10:
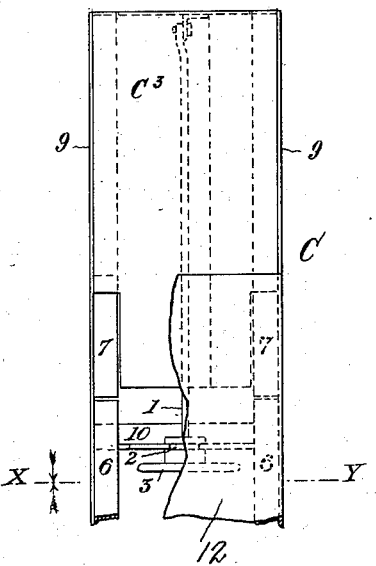
Figure 12:
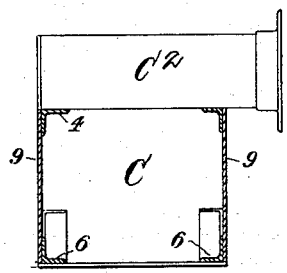

In the accompanying drawings, Figure 1 is a side elevation, and Fig. 2 an end elevation, of a washing plant. Fig. 2$^A$ is a sectional detail view of a roller-valve in a water-supply cistern. Fig. 3 is a longitudinal sectional elevation, Fig. 4 an end view, and Fig. 5 a plan, of the washing-machine proper. Fig. 6 is a detail side view of the belt; Fig. 7, a detail end view of same; Fig. 8, a vertical section through a belt-link, and Fig. 9 a similar view showing it taken apart. Fig. 10 is a fragmentary top plan view of the trough-shaped frame and the tail-plate, and Figs. 11 and 12 are cross-sections thereof on line X Y of Fig. 10 looking in opposite directions.

The crushed pyrites or other mineral is delivered by the elevator A into the hopper B, from which it is supplied onto the upper part of the washing-machine, near the higher end of same, in a steady and uniform manner by means of some well-known mechanical feeding or sprinkling appliance, such as a jigging-tray or worm or paddle feed.

The lower or trough part C of the washing-machine presently to be described is supplied with water from a cistern E at a pressure suitable for the mineral to be cleaned. The drawings show a preferred automatic device for maintaining the water-supply at a constant pressure. The cistern E (see Figs. 2 and 2$^A$) is divided into two compartments by a partition E', between which compartments communication may be made through grated openings in the partition by a roller-valve E$^\times$, made of sheet-rubber or other suitable flexible sheet material, which at its upper end is fixed to the partition E' and at its lower end fixed to a roller E$^4$. The latter is connected to a float E$^2$ by a cord E$^3$, passing over the pulley O. The roller E$^4$ is weighted.

The water-supply to the washing-machine is drawn from the smaller compartment of the cistern, and it is evident that if the water in the larger compartment of the cistern is maintained at a higher level the counter action of the float E$^2$ and roller-valve E$^\times$, acting through the cord over the pulley O, will cause the water in the smaller compartment to be kept at a uniform level, the sinking of the float opening the valve sufficiently to admit as much water from the large compartment as is being drawn off from the small.

The washing-machine is set at an inclination suitable for the material to be washed and works in such a manner that the water, together with the lighter portions of the mineral treated, is delivered onto a screen of gauze or other suitable separating medium at the lower end of the machine, so that the water is drained off and discharged down the spout M into the settling-tank K, while the lighter portions of the mineral are delivered into the hopper F and the heavier portions are by the operation of the machine conveyed to the higher end of the same and delivered into the hopper G. From the hoppers F and G the cleaned materials may be delivered into wagons at J and I, and the water from the settling-tank K may be delivered back to the large compartment of the cistern E, by means of a suitable centrifugal or other valveless pump H, through the delivery-pipe L.

The power necessary to drive the moving portion of the washing-machine may be obtained from any convenient shaft and pulley N.

Figs. 1 and 2 show one washing-machine only. We may, however, in some cases use several machines, placed side by side, and may use one for each grade of the crushed material, or we alter one machine so as to suit each grade, for which purpose we may vary the inclination of the machine, the pressure of the water or the speed, and the fineness of the porous medium through which the water passes in the machine, as will be explained hereinafter.

Referring now to Figs. 3 to 9, it will be seen that the trough-shaped frame C of the machine has supported within its sides upon suitable brackets the water-supply portion C', with the water-inlet $C^2$ and the adjustable tail-plate $C^3$, the use of which will be presently explained. Over and under the water-supply portion C' is an endless traveling belt $C^4$ of an open form and having upturned sides or flanges $c^2$, the said belt sliding along under and over the water-supply portion C' in such a manner as to compel the water from C' to pass up through the open portions of the belt $C^4$, in the middle portion of its upper web. The endless belt $C^4$ is supported upon the wheels or drums $C^5$, which are secured to suitable shafts working in bearings attached to the upper sides of the trough C. In order to take up any slack or wear, we make one pair of these bearings to be adjustable by screws in a well-known manner. At each end of the trough C and fixed between its sides we provide perforated or gauze screens P and Q, in order that the mineral and its refuse may in passing over them be drained of the water used in washing it. The used water passes away at the spout $C^6$ into the pipe M and tank K, Fig. 1. In order to secure a free delivery of the lighter portions of the mineral which are carried down with the water onto the screen Q, we may provide a delivery-plate R, hinged at its lower end and resting upon the belt at its upper. The open portions of the belt $C^4$ are fitted with a porous membrane or gauze U, Figs. 7 and 9, referred to later on, upon the upper surface of which the mineral to be washed is distributed. The tail-plate $C^3$ is preferably adjustable, and to this end has sliding motion between the sides 9 9 of the trough-shaped frame C. To this end said frame has secured to its sides 9 angle-brackets 6, at the opposite upper edges of said sides, for securing the wall 12 of the water-supply duct, Fig. 10. The angle-brackets 6 are stopped at some distance from the top plate 12 to allow for the travel of the tail-plate $C^3$, which latter is fitted to slide between the sides 9 9 of the trough-shaped frame C, as above stated, and is supported and guided on and by angle-brackets 7, Figs. 10 and 11, the horizontal or top part of said plate having recesses in its opposite sides, so as to clear the angle-brackets 6, which lie slightly above the guide and supporting-bracket 7, so as to enable the left end of the tail-plate $C^3$, when adjusted to the position 5, (shown in dotted lines in Fig. 3,) to slide under the wall 12 of the water-supply duct C'. The right-hand curved portion of the tail-plate $C^3$ is notched out at $c^\times$, Fig. 11, so as to rest and slide on angle-brackets 4, Fig. 11, secured to the lower edges of the trough-shaped frame C. The tail-plate $C^3$ is adjusted by means of a hand-wheel 3, having a groove in its hub fitted in a suitable seat in a cross-bar or in the vertical member of an angle-brace 10, Fig. 10, so as to revolve freely and at the same time be held against endwise motion. The hub of the hand-wheel 3 is screw-threaded internally and works on the threaded end of an actuating-rod 1, connected with the curved portion of the tail-plate $C^3$, as shown in Figs. 3 and 10, so that by turning said hand-wheel in the proper direction the tail-plate can be moved from right to left, and vice versa, so that when drawn back into the dotted position or into any intermediate position it will allow the water to pass through the belt again, but in the opposite direction, and thereby redeposit upon it a portion of the mineral which has been carried downward by the water and allow it to be rewashed. In order to prevent any of the heavier mineral from being carried past the screen P, we provide a spray-pipe T, from which jets of water are sent against the under side of the belt $C^4$, causing any mineral adhering to its upper surface to be washed off.

Figs. 6, 7, 8, and 9 show in detail the manner in which we prefer to make the belt, which in this form is of metallic construction and is formed of a number of sections of links connected together. Each link consists of three or more cross-bars c, having end plates or flanges c', to which are attached sides $c^2$, which project in an upward and downward direction. The link has projecting gudgeons $c^3$, Fig. 7, by means of which the links are attached together. The bars c we may make set at an angle, as shown, in order to more perfectly direct the flow of water in an upward direction. The sides $c^2$ we make so that those of the adjacent links overlap. The gudgeons $c^3$ we make part circular in section and with a portion cut away, so that when the gudgeons of two adjacent links are connected together by the sleeves $c^4$ they may be allowed to move through an angle sufficient for them to pass around the wheels $C^5$. On the top surface of the link, as described above, we place one or more thicknesses of wire-gauze or other porous material U, which is held in place by the grid $c^7$, as shown most clearly in Fig. 9, where the parts c, $c^7$, and U are shown taken apart. The cross-bars of this grid also form dams for preventing any of the heavier portion of the mineral from being washed downward. Where two thicknesses of material are used, we make the upper one coarser and stronger in order to protect the lower one from wear.

The operation of the machine is as follows: The machine being set at a suitable angle for the material to be washed, the water after coming up through the gauze U of the belt $C^4$ from the water-supply portion C' flows between the upturned sides $c^2$ of the belt toward the screen Q, the under side being closed between these points by the tail-plate $C^3$, over which the belt slides. The belt $C^4$ is caused to travel in the opposite direction to the flow of the water. The crushed material is supplied from the hopper B onto the upper surface of the belt, near the higher end of same. The upward flow of the water from C' through the porous membrane U lifts the lighter portions of the mineral and carries them downward over the delivery-plate R onto the screen Q, while the heavier portions remain on the belt and are delivered onto the screen P.

We have now particularly described one method by which we may carry out our invention. It is evident, however, that it may also be carried out in several other ways—as, for example, the sides may be fixed and the horizontal surface of the belt only moved, and instead of a metallic grid-like belt covered with porous material a porous belt, of canvas or other non-metallic material, may be used.

It is also to be noticed that with minerals in which the refuse is the lighter, such as in the case of pyrites, the refuse will be delivered at the lower end of the belt and the pyrites at the higher, while in the case of minerals in which the refuse is the heavier, such as coal, the refuse will be delivered at the higher end and the coal at the lower.

We claim—

1. In a mineral-washing apparatus an endless inclined metallic traveling belt, metallic prismatic grid-bars inclined downwardly in the direction of travel, a second series of grids on the bases of said prismatic grids carrying the load, a screen between said series of grids, upstanding overlapping side plates at the ends of said grids to form a traveling trough and means for projecting water up through the belt contrary to the direction of travel, substantially as set forth.

2. In a mineral-washing apparatus the combination of an endless inclined traveling belt of an open form between upstanding sides, a water-supply device arranged between the two webs of the belt for the purpose stated, and the automatic means for regulating the action of the water, said means consisting of a water-tank divided in two compartments, openings in the partition-wall, a roller-valve on one side of said wall for covering and uncovering said openings, and a float connected to said valve for automatically regulating the water-level on the other side of said wall substantially as set forth.

3. In a mineral-washing apparatus an endless inclined traveling belt of grid-bars with end gudgeons and with flanges and with upstanding sides attached to the latter, said grid-bars and gudgeons being made in two parts, so that the last bar of one belt-link and the first bar of the next belt-link form a complete grid-bar with a radial joint between them, a porous fabric on outer side of the belt, and a water-supply device arranged between the two webs of the belt and adapted to project the water up through the grids of the upper web in the middle and higher portion of same, substantially as and for the purpose set forth.

4. In a mineral-washing apparatus the combination of an endless inclined traveling belt, of an open form between upstanding sides, the water-supply device for projecting the water up through the upper web in the middle and higher portion of same, an adjustable tail-plate below the upper web at the lower end of same, for allowing part of the water to pass through the belt again but in the opposite direction and thereby deposit upon it a portion of the mineral which had been carried down by the water and allow it to be rewashed, a spray-pipe for washing off any mineral adhering to the upper surface of the belt, and means for regulating the action of the water substantially as set forth.

5. In a mineral-washing apparatus, an endless belt formed of links, each link provided with side plates longer than said link, prismatic bars arranged to form slots narrower at the top than at the bottom and bearing collars to connect separate links, and means for projecting water up through said belt substantially as and for the purpose set forth.

6. In a mineral-washing apparatus an endless inclined belt of an open form between outstanding sides, in combination with a mineral-supply device arranged between the two webs of the belt and adapted to project the water up through the middle and higher portion of the upper web, a trough wherein the belt works with outlet-spout thereon for the used water, a perforated screen for the outlet of the lighter portions of the mineral at the same end, a perforated screen at the other end for the outlet of the heavier portions of the mineral, receptacles for the used water, for the lighter portions and for the heavier portions of the mineral, a tank for water-delivery to the aforesaid water-supply device, and a pump for returning the used water to the tank, substantially as set forth.

In testimony that we claim the foregoing as our invention we have signed our names in the presence of the subscribing witnesses.

CUTHBERT BURNETT.
HENRY THORNTON NEWBIGIN.

Witnesses to the signature of Cuthbert Burnett:
GEO. WM. FOX,
GEO. DAVISON.

Witnesses to the signature of Henry Thornton Newbigin:
A. B. GOLDSBROUGH,
HOWARD WILSON.